E. MONTI.
PROCESS OF CLARIFYING, AGING, AND REFINING WINES, LIQUEURS, AND OTHER VEGETABLE EXTRACTS.
APPLICATION FILED SEPT. 29, 1905.
1,108,777.
Patented Aug. 25, 1914.
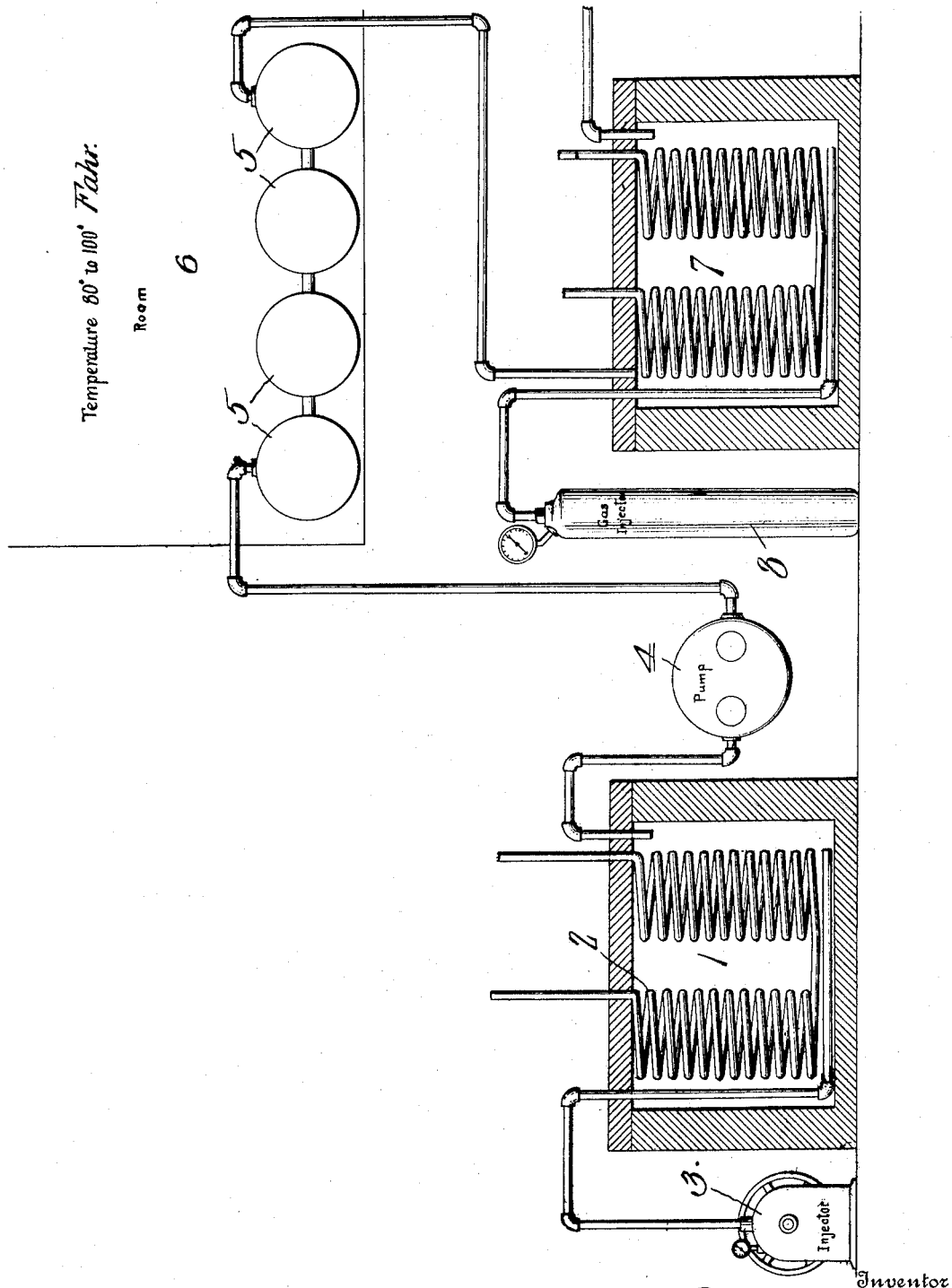

UNITED STATES PATENT OFFICE.

EUDO MONTI, OF TURIN, ITALY.

PROCESS OF CLARIFYING, AGING, AND REFINING WINES, LIQUEURS, AND OTHER VEGETABLE EXTRACTS.

1,108,777.      Specification of Letters Patent.      Patented Aug. 25, 1914.

Application filed September 29, 1905. Serial No. 280,700.

*To all whom it may concern:*

Be it known that I, EUDO MONTI, a subject of the King of Italy, and resident of Turin, in Italy, have invented certain new and useful Improvements in Processes of Clarifying, Aging, and Refining Wines, Liqueurs, and other Vegetable Extracts, of which the following is a specification.

This invention relates to a process of clarifying, aging and refining vegetable extracts, such as wines and other alcoholic liquors and has for an object to oxidize said liquors in order to improve their taste and correspondingly increase their value.

Another object of this invention is to provide a process whereby approximately all the tartar, along with the albuminous and other undesirable matters may be separated from the wines.

Still another object, is to transform into tartaric acid and to separate from the wine as tartar, such of the oxidizable acids (as *e. g.* malic, succinic and the like) as are undesirable in good wines.

This process is founded upon the following well-known discoveries: Louis Pasteur's discovery that wine could be made to taste and look old by slowly oxidizing it at ordinary temperature; and Frantz Malvezin's discovery that wine could be made to taste old by first warming it, then injecting a suitable quantity of air into it while still warm, then cooling it very quickly in a coil and lastly filtering it while cool. From these two discoveries, it became evident that it is the air which ages the wine, and the more air that is dissolved into the wine, the more rapid is the process of ripening. It is a well-known fact that air dissolves in wine and spirits in proportions which increase as the temperature of the wine or liquor descends. Thus while 1000 c. c. of wine will dissolve 17 c. c. of air or say 12 c. c. of oxygen at the temperature of $+20°$ C., the same quantity of wine cooled to $0°$ C., will dissolve 25 c. c. of air, and at $-10°$ C., will dissolve 40 c. c. It is also a well-known fact that the solubility of bitartrates and other matter dissolving in the wine, diminishes considerably while the wine is being cooled, and that on the other hand, pectin and other albuminous matters curdle and separate much more quickly at a comparatively high temperature. I have also ascertained that air dissolved in wine under pressure at a very low temperature and allowed to act while expanding at a comparatively high temperature, will oxidize the wine much more quickly, than air at the usual temperature and turn its color from red to yellow or from white to brown.

The aging of spirits will only be obtained by this process if wood extract is dissolved in them, as it usually occurs when they are kept in oak wood casks or put in contact with oak wood shavings.

The present process which involves an increased percentage of dissolved oxygen and the conversion of a part of it into a more active form, is characterized by the following steps:

First step, the strong wine or spirit is cooled to the lowest possible temperature without freezing and saturated with air. This may be done under pressure Second step, the wine is stored in a cool room and the treatment with air repeated until the wine becomes clear and the insoluble matter separates.

Third step, the wine thus saturated, is slowly transferred to a room of summer temperature $+25°$ to $+35°$ C. where it is left until some of the dissolved air becomes separated, and the wine appears clear again.

Further cooling of the wine causes a new quantity of tartar and other insoluble matters to separate. The saturation with cold air, followed by the warming up to make said air expand slowly, is repeated until the wine or spirit tastes and looks as old and as clear as desired. By this process, wine and brandy may in six months be caused to taste like wine or brandy six years old.

The accompanying drawing shows diagrammatically an apparatus suitable to carry out the process of the present invention.

The wine is stored in well insulated tanks or reservoirs 1, and cooled by means of refrigerating coils 2, to a temperature near the freezing point of the wine. While the wine is being cooled, I saturate it with finely divided air by means of an injector 3, repeating the operation until, in a few days, the wine becomes perfectly clear. By means of a pump 4 it is then conveyed to barrels 5 stored in a room 6, which room is warmed in winter to a temperature ranging from +25° to +35° C., and left open in summer. When the wine, cooled almost to freezing point, is impregnated with air, the malic, succinic and other oxidizable acids contained therein, will oxidize, after having been converted into tartaric acid and then precipitated as bitartrate of potash or lime. The oxygen will then act much more quickly when the wine is warmed slowly in a room the temperature of which ranges from +25° to +35° C. Should there not be enough potash or lime present in the wine to precipitate all the tartaric acid formed, the free tartaric acid slowly combines with the alcohol to form ethers, which greatly improve the taste of the wine. Those bitartrates which are formed when the wine is warmed, are separated out by again cooling the wine to almost freezing point. Should another oxidation be necessary to eliminate more of the oxidizable acids (as it for instance would be necessary with concentrated wines) the second cooling must also be carried on in the presence of air. The last cooling however, must always take place with the exclusion of air or better still, in an atmosphere of inert or reducing gas which is free from active oxygen and not injurious to wine. This gas may be dry carbonic acid, nitrogen or any similar inert gas. The wine having remained in the warm room until a sufficient quantity of the oxidizable acids have been transformed into tartaric acid, it is next conveyed to a refrigerating tank 7 by means of a pump 4. Said tank 7 is previously filled with dry carbonic acid, nitrogen, or the like by means of the gas injector 8. The wine is allowed to remain in this tank until it becomes perfectly clear without straining it.

This process is especially well-adapted for white, yellow and brown strong wines such as Marsala, Malaga, sherry, Madeira, and the like as well as to fortified white wines.

For the oxidation and clarification of red wines, especial care must be taken to dilute the oxygen with from one to three volumes of carbonic anhydrid or other gas free from oxygen according to the alcoholic strength of the wine, inasmuch as oxidation of the cenocyanin (the coloring matter of red wines) will cause it to turn yellow first and to precipitate afterward.

Beverages, such as brandy, cognac and liqueurs become aged when cooled to a temperature below −18° C., saturated repeatedly with air while at this temperature, and afterward stored in a warm room, until the acids combine with the alcohol forming ethers.

The term "alcoholic liquors" as used in the claims, is intended to include alcoholic or spirituous fluid, either distilled or fermented.

I claim:—

1. A process of treating beverages consisting in cooling the beverages almost to their freezing point, in repeatedly saturating the beverages with air while cool in order to oxidize said beverages, in subsequently warming the beverages slowly to a temperature not to exceed +35° C. thereby liberating oxygen contained in the dissolved air, and finally in cooling the beverages in the absence of air in order to separate the tartar and other insoluble matter formed during oxidation.

2. A process of clarifying and oxidizing beverages, consisting in cooling the beverages almost to their freezing point, in saturating the beverages, while cool, with finely divided air, subsequently in slowly warming the beverages to a temperature not to exceed +35° C. and finally in cooling said beverages in a non-oxidizing atmosphere.

3. A process of clarifying and oxidizing alcoholic liquors, consisting in first cooling said liquors almost to their freezing point, in repeatedly saturating the liquors with finely sprayed air while maintained at the low temperature, subsequently in slowly warming the liquors to a temperature not to exceed +35° C. and finally in cooling them in an inert atmosphere.

4. A process of treating wine, consisting in cooling the wine almost to freezing point, repeatedly saturating the wine with air at said temperature until the wine becomes clear, then slowly transferring said wine to a chamber of a temperature not exceeding +35° C. in order to permit the acid to slowly oxidize, subsequently cooling the wine with the exclusion of air almost to freezing point, and maintaining said wine at this temperature until perfectly clear.

5. A process of treating wine consisting in cooling the wine almost to its freezing point, saturating the wine with air while at this temperature and slowly warming said wine in order to cause the dissolved oxygen to be slowly liberated and to oxidize the acids and coagulate the albumin and other noxious ingredients in the wine, subsequently cooling the wine to almost its freezing point and maintaining said wine at this temperature until the oxidizable acids have separated as bitartrates, or have combined with the alcohol to form ethers.

6. A process of clarifying, aging and refining liquefied vegetable extracts such as wines and liqueurs, consisting in saturating the extracts with air at a temperature of almost freezing point of said extracts until all insoluble matter has been separated; in subsequently increasing the temperature of the extracts slowly to between +25° C. and +35° C. until the liberated air has been set free, causing a separation of products of oxidation; and in repeating said alternate cooling and warming of the extracts, until all insoluble matter has been separated and a sufficient quantity of ether has been produced.

In testimony whereof I have signed my name to this specification in the presence of two subscribing witnesses, in Turin, Italy, September 12th, 1905.

EUDO MONTI.

Witnesses:
 HUDJ. O. FRYZOLLI,
 ALEX. PIZZOTI.